United States Patent
Xu et al.

(10) Patent No.: US 7,855,992 B2
(45) Date of Patent: Dec. 21, 2010

(54) MULTI-ANTENNA SOLUTION FOR MOBILE HANDSET

(75) Inventors: Luzhou Xu, Shanghai (CN); Yanzhong Dai, Shanghai (CN); Jian Liu, Shanghai (CN); Ronghui Wu, Shanghai (CN); Min Shi, Shanghai (CN); Yun Yuan, Shanghai (CN); Yan Li, Shanghai (CN)

(73) Assignee: ST-Ericsson SA, Geneva (CH)

( * ) Notice: Subject to any disclaimer, the term of this patent is extended or adjusted under 35 U.S.C. 154(b) by 1302 days.

(21) Appl. No.: 10/540,791

(22) PCT Filed: Dec. 22, 2003

(86) PCT No.: PCT/IB03/06209

§ 371 (c)(1),
(2), (4) Date: Feb. 6, 2006

(87) PCT Pub. No.: WO2004/059878

PCT Pub. Date: Jul. 15, 2004

(65) Prior Publication Data

US 2006/0233221 A1    Oct. 19, 2006

(30) Foreign Application Priority Data

Dec. 30, 2002    (CN) .............................. 02 1 60459

(51) Int. Cl.
*H04W 4/00* (2009.01)
(52) U.S. Cl. ..................................................... 370/334
(58) Field of Classification Search ................ 370/334, 370/337; 700/53; 455/562.1
See application file for complete search history.

(56) References Cited

U.S. PATENT DOCUMENTS

| | | | |
|---|---|---|---|
| 6,069,912 A | 5/2000 | Sawahashi et al. | |
| 6,618,434 B2 | 9/2003 | Heidari-Bateni et al. | |
| 6,879,624 B2 | 4/2005 | Sano | |
| 7,639,199 B2 * | 12/2009 | Rofougaran | 343/860 |
| 2003/0027540 A1 * | 2/2003 | Da Torre | 455/277.1 |
| 2003/0169720 A1 * | 9/2003 | Sebastian et al. | 370/342 |
| 2009/0149136 A1 * | 6/2009 | Rofougaran | 455/77 |

FOREIGN PATENT DOCUMENTS

| | | |
|---|---|---|
| EP | 0 892 504 A1 | 1/1999 |
| JP | 02149022 A | 6/1990 |
| JP | 2002190759 A | 7/2002 |
| JP | 2002232385 A | 8/2002 |
| JP | 2004-533176 A | 10/2004 |
| WO | WO 01 59945 A1 | 8/2001 |
| WO | WO 02/098012 A1 | 12/2002 |

OTHER PUBLICATIONS

Search Report dated Jun. 23, 2010 in connection with Taiwan Patent Application No. 92134422.

* cited by examiner

*Primary Examiner*—Diane Mizrahi

(57) ABSTRACT

A mobile terminal with multi-antenna (200) based on CDMA, comprises a plurality of groups of radio frequency signal processing modules (202), for transforming received multi-channel radio frequency signals based on CDMA to multi-channel baseband signals; a multi-antenna module (206), for combining said multi-channel baseband signals output from the plurality of groups of radio frequency signal processing modules into single-channel baseband signals according to control information received one-off when said multi-antenna module enables a multi-antenna baseband processing; and a baseband processing module (203), for providing said control information to said multi-antenna module and baseband processing said single-channel baseband signals outputted from said multi-antenna module.

46 Claims, 12 Drawing Sheets

MULTI-ANTENNA SOLUTION FOR MOBILE HANDSET

FIELD OF THE INVENTION

The present invention relates to a receiving device for mobile terminals and the receiving method thereof; and, more particularly, to a multi-antenna receiving device for mobile terminals and the receiving method thereof.

BACKGROUND OF THE INVENTION

With mobile subscribers increasing, a requirement emerges for modern mobile communication systems to maintain high quality while enlarging the communication capacity. Among such attentions, multi-antenna technology arises as a hot issue in 3G mobile communication fields.

Multi-antenna technology, usually including spatial diversity and adaptive antenna technology, employs at least two antennas to receive signals in receiving directions and combines multiple parallel signals by processing methods such as diversity and beam forming, to achieve better performance than conventional uni-antenna.

Researches show that the introduction of multi-antenna can effectively increase SNR (Signal to Noise Ratio) of signals and thus greatly improve the communication quality during communication process. However, mobile terminals of current communication systems generally use the processing module for uni-antenna systems. If multi-antenna technology is to be applied in present mobile terminals, both the hardware and the software of the processing module need to be redesigned, which can be very expensive. Therefore, how to make modifications based on present mobile terminals and take full advantage of the hardware and software resources of the processing module of uni-antenna systems, comes as a key issue for multi-antenna to be applied in mobile terminals.

Now an example of a mobile terminal based on WCDMA (Wide-band Code Division Multiple Access) standard is given to show the makeup of the uni-antenna system in current mobile terminals and the challenges multi-antenna faced when applied to the said uni-antenna system.

FIG. 1 is a block diagram for a standard mobile phone with uni-antenna, comprising an antenna 100, a RF module 101, a RF interface module 102, a baseband MODEM module 103, and a system controller & source CODEC module 105. In the figure, the baseband MODEM module 103 may be composed of Rake receiver, spreading/de-spreading module, modulating/demodulating module and Viterbi/Turbo coding/decoding module; while system controller & source CODEC module 105 may be composed of controller and source coder/decoder.

In the downlink, radio signals received by antenna 100 are first amplified and down converted to IF (intermediate frequency) signals or analog baseband signals in RF module 101; then the IF signals or analog baseband signals are transformed to digital baseband signals to be inputted into baseband MODEM module 103, after being sampled and quantified in RF interface module 102; in baseband MODEM module 103, signals obtained from successive operations such as Rake reception, de-spreading, demodulating, de-interleaving, Viterbi/Turbo decoding, rate matching and etc, are provided to system controller & CODEC 105; in system controller & CODEC 105, the data processed by baseband MODEM module 103 will be further processed in data link layer, network layer or higher layer, including higher layer signaling processing, system control, source coding/decoding and etc.

Presently, the above uni-antenna mobile phone technology is quite mature indeed. Many manufacturers, including Philips, have developed sound chip-set solutions, where the function of the said baseband MODEM module 103 is generally realized by ASIC (application specific integrated circuits).

Whereas introducing the multi-antenna technology into present mobile phones will completely change the whole baseband module 103, whose hardware and corresponding software, such as Rake receivers, de-spreading and etc, can hardly be utilized. Therefore, how to make modifications based on present mobile terminals and effectively take advantage of the hardware and software resources in the processing module of uni-antenna systems, still remains as a problem to be settled for multi-antenna to be applied in mobile terminals.

BRIEF SUMMARY OF THE INVENTION

One object of the present invention is to provide a receiving device and receiving method for multi-antenna mobile terminals, capable of reusing the software and hardware design of present standard baseband MODEM modules without making significant modifications.

Another object of the present invention is to provide a receiving device and receiving method for multi-antenna mobile terminals, capable of configuring and selecting different multi-antenna processing algorithms flexibly.

A still further object of the present invention is to provide a receiving device and receiving method for multi-antenna mobile terminals, capable of improving the operating efficiency and performance of the system.

To achieve the object above, a multi-antenna mobile terminal based on CDMA mode as proposed by this invention, comprises:

a) a plurality of groups of RF (radio frequency) signal processing modules, for transforming received multi-channel RF signals based on CDMA to multi-channel baseband signals;

b) a multi-antenna module, for combining multi-channel baseband signals outputted from said plurality of groups of RF signal processing modules into single-channel baseband signals according to control information received one-off when said multi-antenna module enables a multi-antenna baseband processing;

c) a baseband processing module, for providing said control information to said multi-antenna module and baseband processing said single-channel baseband signals outputted from said multi-antenna module.

To achieve the object above, a method for a multi-antenna mobile terminal based on CDMA mode as proposed by this invention, comprises steps of:

a) transforming received multi-channel RF signals to multi-channel baseband signals;

b) combining said multi-channel baseband signals into single-channel baseband signals according to control information received one-off when multi-antenna baseband processing is enabled; and c) baseband processing said single-channel baseband signals.

To achieve the object above, a multi-antenna processing device as proposed by this invention, comprises:

a) a plurality of spatial filters, each of them setting its working mode according to received instructions, and processing the inputted multi-channel baseband signals according to received information related to spatial features of signals of each specific path to separate signals of each specific path from mixed signals;

b) a combiner, for time aligning and combining signals outputted from each of said spatial filters according to received synchronization information and instructions;
c) a synchronization module, for providing time synchronization and time delay information about spatial features of signals of each specific path to said spatial filters and said combiners according to the received instructions and the inputted multi-channel baseband signals;
d) a controller, providing said instructions to said synchronization module, said spatial filters and said combiner, according to the received control information To achieve the object above, a multi-antenna processing device as proposed by this invention, comprises:
a) a plurality of processing modules corresponding to a plurality of transmit antennas in a wireless communication system, receiving and processing signals from a plurality of transmit antennas, wherein:
  each of the processing modules corresponding to transmit antennas is composed of a group of spatial filters, and receives and processes signals from a specific transmit antenna, wherein:
    each group of spatial filters include several spatial filters, each setting its working mode according to received instructions and processing the inputted multi-channel baseband signals according to received information related to spatial features of signals of each specific path, to separate signals of each specific path from mixed signals;
b) A combiner, for combining signals outputted from the said each group of spatial filters according to received synchronization information and the said instructions;
c) A synchronization module, for providing time synchronization and time delay information related to signals transmitted by the several transmit antennas and signals of each specific path to the said each group of spatial filters in the said each processing module corresponding to transmit antenna and the combiner;
d) A controller, for providing the said instructions to the said synchronization module, the plurality of spatial filters in each processing module corresponding to transmit antenna and the combiner, according to the received control information.

BRIEF DESCRIPTION OF THE DRAWINGS

Further description of the invention will be given in the following, in conjunction with accompanying drawings, in which.

DETAILED DESCRIPTION OF THE PREFERRED EMBODIMENTS

Detailed description of the invention will be given in the following, in conjunction with accompanying figures and preferred embodiments, with a WCDMA system as the example.

Figure 1:
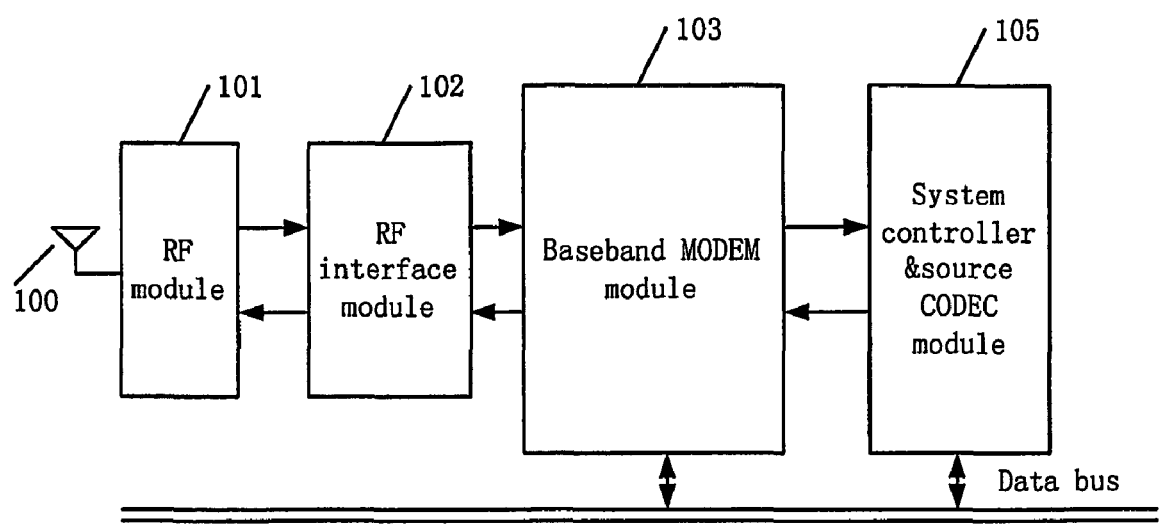
FIG. 1 is the block diagram of a current uni-antenna mobile terminal based on WCDMA standard.
Figure 2:
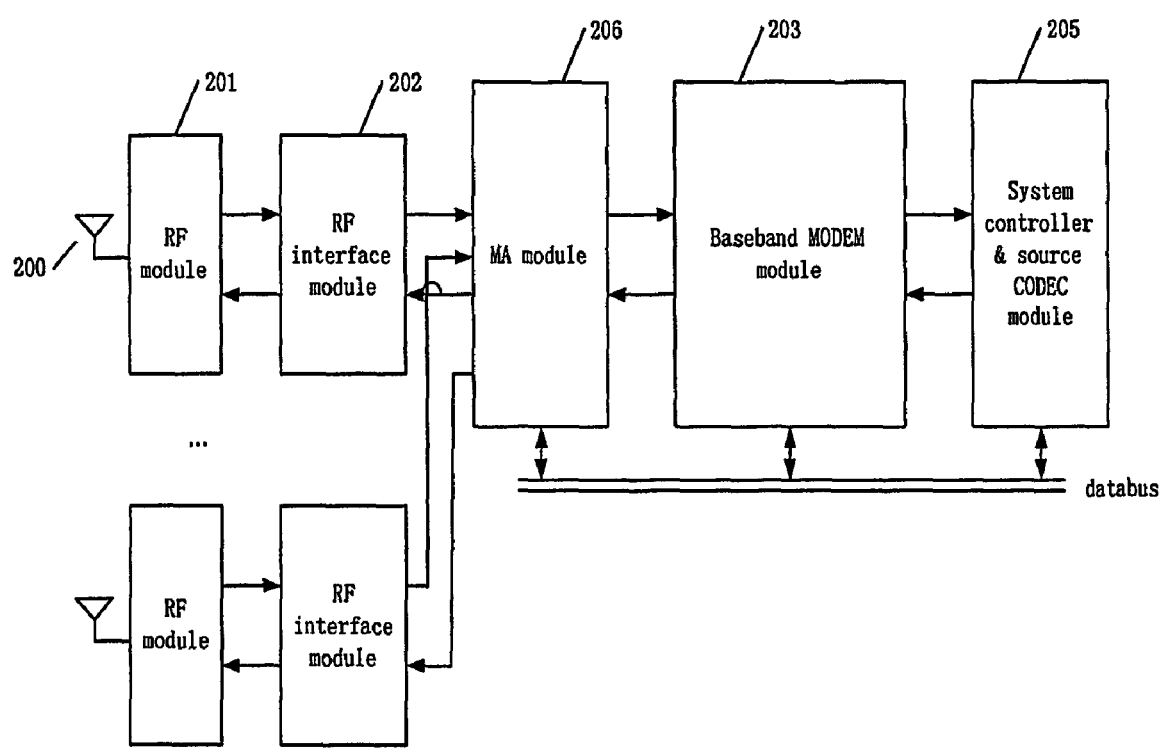
FIG. 2 is the block diagram of the receiving device of a multi-antenna mobile terminal based on WCDMA standard according to the present invention.

FIG. 2 is the block diagram of the receiving device of a multi-antenna mobile terminal based on WCDMA standard in the present invention;

As best shown in FIG. 2, the receiving device includes: a plurality of groups of RF processing modules composed of multiple antennas 200, multiple RF modules 201 and multiple RF interface modules 202; an MA module 206; a baseband processing module composed of a baseband MODEM module 203 and a system controller & source CODEC 205. More specifically, multiple antennas 200 are used for receiving RF signals; multiple RF modules 201 are used for amplifying and down-converting RF signals received by each antenna 200 to transform them into IF (intermediate frequency) signals or analog baseband signals; multiple RF interface modules 202 are used for sampling and quantifying the IF or analog baseband signals outputted from each RF module 201 to transform them into digital baseband signals; an MA module 206; a baseband MODEM module 203 connected with the bus, is used for processing the digital signals processed by the MA module 206 in physical layer, i.e. performing operations as Rake reception, de-spreading, demodulating, de-interleaving, Viterbi/Turbo decoding, rate matching and etc; a system controller & source CODEC 205 connected with the bus, is used for processing the data processed by baseband MODEM module 203 in link layer, network layer or higher layer, i.e. higher layer signaling processing, system controlling, source coding/decoding and etc.

Compared with the receiving device of current uni-antenna mobile terminals, an MA module 206 is added into the device shown in FIG. 2. The MA module 206 has an interface compatible with RF interface module 202 and baseband MODEM module 203, and the time delay caused by inserting the MA module 206 can be ignored, because it is very slight.

Operations of the newly added MA module 206 include: processing digital baseband signals outputted from each RF interface module 202 and combing them into single-channel signals, and transferring the combined signals to baseband MODEM module 203, according to the control information from baseband MODEM module 203 and system controller & source CODEC 205 via a bus.

The control information transferred via the bus comprises working status information of the mobile terminal and configuration information of the base station's antennas for transmitting signals. The working status information of the mobile terminal includes information when the mobile terminal is in cell search, normal connection, or soft handover stages. The configuration information of the base station's antennas includes information about whether the base station for transmitting signals employs uni-antenna, open-loop transmit diversity, closed-loop transmit diversity or smart antenna transmitting signals.

Additionally, the above control information provided by baseband processing module to MA module 206 can be transferred via a data bus, as well other data lines.

Description about the constitution and working principles of the said MA module 206 will be given below. Further description will be offered later to explain the flexible configurations and the execution of different multi-antenna processing algorithms of MA module 206.

Figure 3:
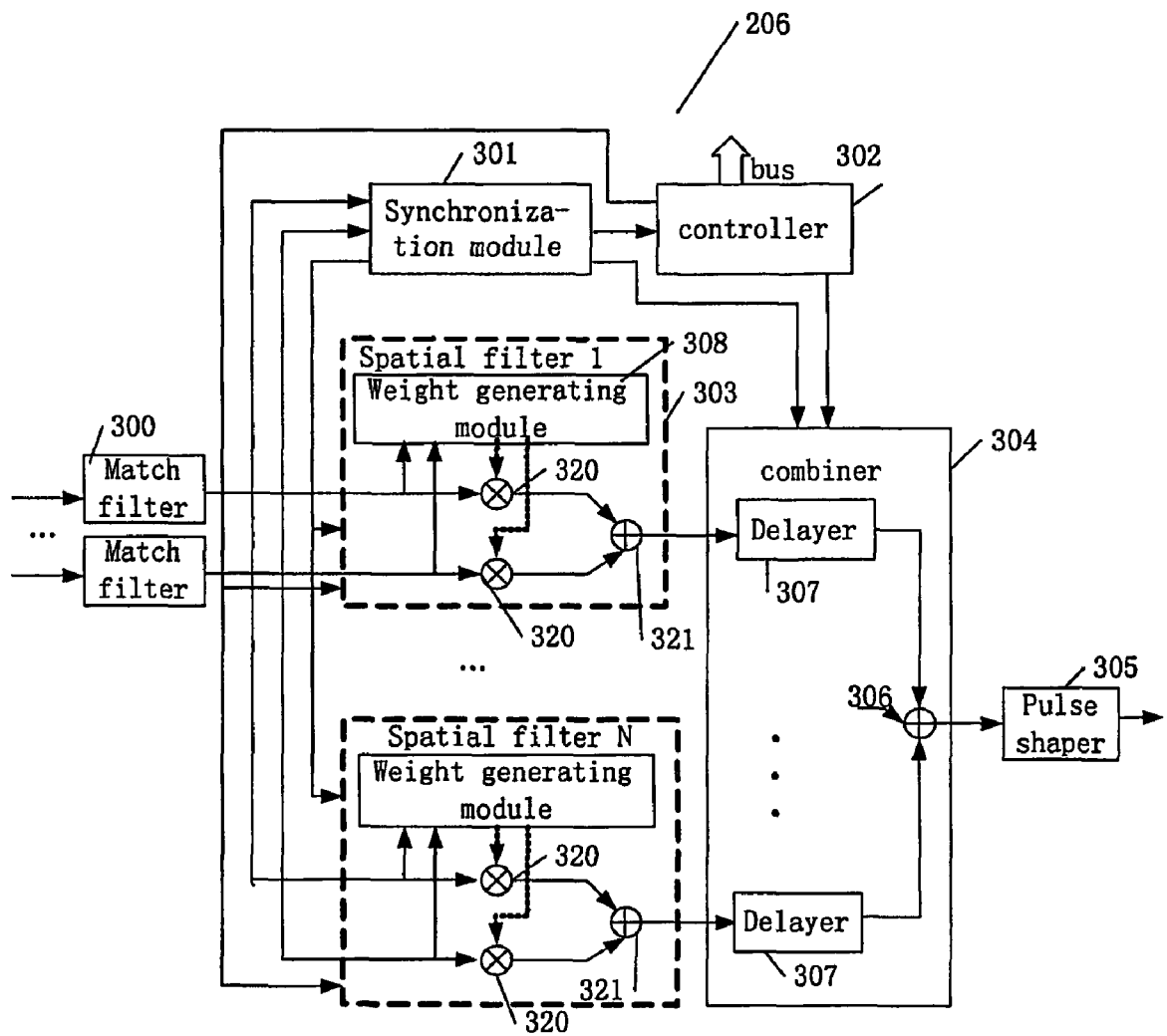
FIG. 3 indicates the architecture for the MA (multi-antenna) module in the receiving device of a multi-antenna mobile terminal based on WCDMA standard according to the present invention.

As indicated in FIG. 3, as to the receiving device for multi-antenna mobile terminals based on WCDMA proposed by this invention, its MA module includes a plurality of MFs (match filter) 300, a synchronization module 301, a controller 302, a plurality of spatial filters 303, a combiner 304 and a pulse shaper 305. Each part will be described as follows.

(1) A Plurality of MFs 300

A plurality of MFs 300 is used for matching signals from each RF interface module 202 in FIG. 2. The match filter 300 is a Root-Raise-Cosine filter.

(2) Synchronization Module 301

According to instructions from controller 302, synchronization module 301 receives signals from each MF 300, and provides information for separating the multi-path of wireless propagation channels to the said spatial filter 303 and provides estimated delay information to the said combiner 304, when realizing time slot and frame synchronization. So far there have been many mature synchronization algorithms, which can be employed in the MA module 206 of the invention. Since synchronization algorithm is not the focus of the invention, it will not be introduced further.

(3) Controller 302

Controller 302 communicates with baseband MODEM module 203 or system controller & source CODEC 204 in FIG. 2 via the said data bus, receives information about the working status of mobile terminals and configuration of the base station's antennas from baseband MODEM module 203 and system controller & source CODEC 205, and sets the working modes and parameters for other modules, such as the synchronization module 301, a plurality of spatial filters 303 and combiner 304.

In standard WCDMA systems, mobile terminals can work in different states, such as cell search, normal connection, soft handover and etc. Meanwhile the antennas of the base station can also employ different configurations, such as uni-antenna, transmit diversity or smart antenna. During the working procedure, MA module 206:

Firstly, obtains information about the working status of the mobile terminal and configuration of base station's antennas by higher layer software, i.e. the system controller in system controller & source CODEC 205 in FIG. 2;

Secondly, transfers the information about the working status of the mobile terminal and configuration of base station's antennas from system controller & source CODEC 205 to controller 302 of MA module 206 in FIG. 3;

Thirdly, sets the working mode and chooses processing algorithms for itself in controller 302, according to known working status and configuration of base station's antennas.

(4) A Plurality of Spatial Filters 303

A plurality of spatial filters 303 receive signals from said each MF 300 and set their working modes and parameters according to instructions from a controller 302 and the synchronization information from a synchronization module 301, and then separate signals of each specific path from mixed signals according to the spatial features of signals of each specific path or transmitted by base station. Each spatial filter 303 further includes a plurality of complex multipliers 320, a combiner such as complex adder 321 and a weight generating module 308. The weight generating module 308 performs multi-antenna processing algorithms to determine the weight. The spatial filter 303 can be designed as a flexible and configurable module, capable of using different multi-antenna processing algorithms depending on different scenarios and conditions. The configuration and processing algorithms of the spatial filter 303 will be elaborated later.

(5) Combiner 304

Signals outputted from each spatial filter 303 are combined in combiner 304 after being time aligned, according to synchronization information from synchronization module 301 and instructions from controller 302.

Before combing signals received by multi-antenna, time alignment is required, because multi-path signals from different base stations or the same base station are usually asynchronous, namely with different time delays. After the multi-path signals with different spatial features are separated using spatial filters 303, in order to avoid cross-interference among the separated signals again, it's necessary to align the signals in time dimension before combining. (Thanks to the correlation feature of spreading code, the interference is least when signals are aligned.)

As shown in FIG. 3, signals from spatial filters will be delayed by delayer 307 before being combined. Each delayer 307 is controlled by synchronization module 301 according to the wireless propagation delay respectively, that is, signals transmitted via paths with bigger delay in air propagation will be delayed less in combiner module 304, and vice versa. In this way, signals after time alignment are synchronous.

Delayer 307 can be implemented using FIFO (First In First Out) technology and the value of delay can be adjusted through controlling the deepness of the FIFO.

(6) Pulse Shaper 305

Having compatible interface with baseband MODEM module 203 in FIG. 2, pulse shaper 305 is used to restore the signal format from the said combiner 304.

Just as MF 300, Root-Raise-Cosine filter is employed in pulse shaper 305 as defined in WCDMA specification.

In the above section, all components in MA module 206 are described one by one. As shown above, according to the present invention, the MA module 206 can flexibly configure its working modes and select multi-antenna processing algorithms, depending on the working status of mobile terminals and configuration of base stations' antennas from system controller & source CODEC 205 inputted via the bus.

In the following section, detailed description will be given to explain the flexible configurations and corresponding processing algorithms of MA module 206, according to the working status of mobile terminals and the configuration of base stations' antenna.

1. Cell search stage (1) Configuration of MA Module 206 (Blind Single Beam Working Mode)

When a mobile terminal is just powered on or entering a new cell, it's required to search for pilot signals and establish cell synchronization first, usually called cell search stage. Before finishing cell search successfully, the mobile phone has no information of pilot signals and cell synchronization is not established either.

In this invention, when control information from the bus indicates the mobile terminal is at cell search stage, the MA module 206 in FIG. 3 is configured as blind single beam working mode, whose characteristic is: neither the pilot information, nor the cell synchronization, is necessary.

When MA module 206 works in the mode of blind single beam, its synchronization module 301 and combiner module 304 are disabled under the control of controller 302, and only one spatial filter 303 is active, whose output is directly sent to pulse shaper 305.

Figure 4:
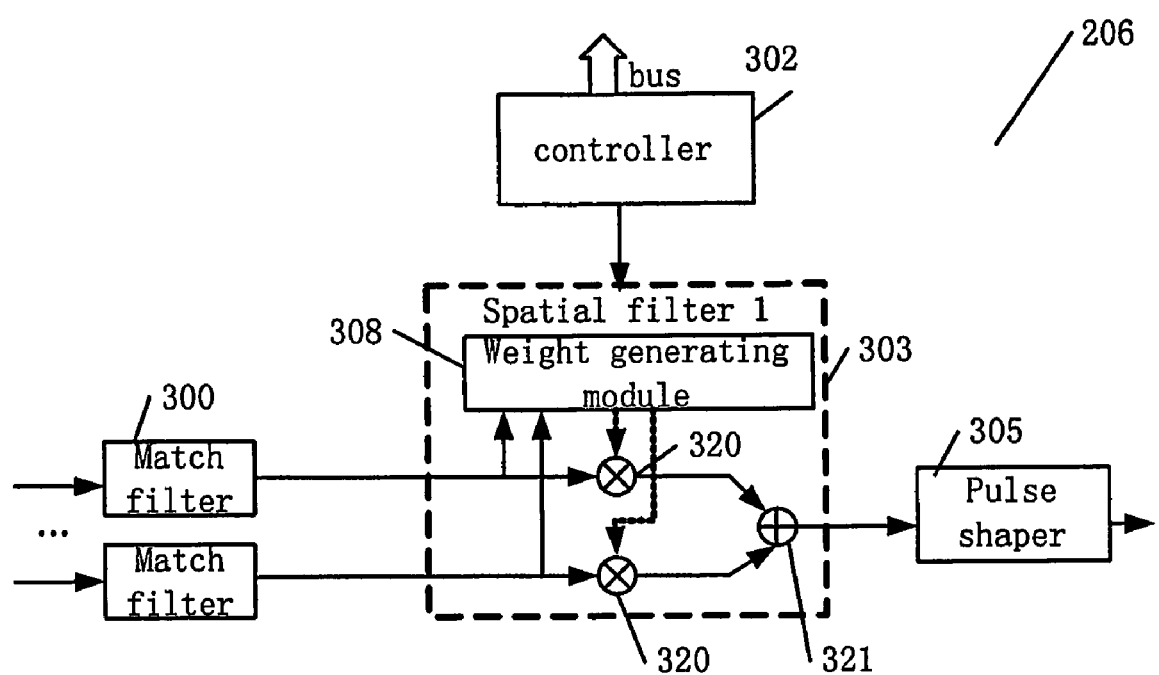
FIG. 4 shows the configuration of MA module in FIG. 3 at cell search stage.

In this case, the equivalent architecture of MA module 206 is shown in FIG. 4, wherein spatial filter 303 includes a plurality of multipliers 320, an adder 321 and a weight generating module 308. The multipliers 320 are used to multiply the input signals from the said each MF 300 by the corresponding channel parameters outputted from weight generating module 308. The adder 321 is used for summing signals outputted from the said each multipliers 320 and outputting the results to the said pulse shaper 305. The weight generating module 308 is used to perform corresponding processing algorithms to estimate channel parameters, according to signals from each MF 300. The processing algorithms to be performed will be elaborated as follows.

(2) The Processing Algorithms Performed by MA Module 206 (Blind Equal-Ratio-Combining Algorithm)

At cell search stage, the MA module 206 in the invention adopts blind equal-ratio-combining algorithm, which is evolved from conventional equal-ratio-combining algorithm.

Now a brief introduction of the conventional equal-ratio-combining algorithm will be given.

Equal-ratio-combining algorithm, namely equal-ratio-combining diversity, is an important and effective method to resist fading. In this method, pilot signals are first used to estimate the absolute phase difference of each received signal caused by propagation, and then received signals are combined in equal ratio after their phases are compensated with the estimated absolute phase difference.

Different from the above conventional equal-ratio-combining algorithm, the blind equal-ratio-combining algorithm adopted in this invention, estimates the relative phase difference between received signals, rather than the absolute phase deference. Therefore, no pilot signal is required in this algorithm.

In the following section, the blind equal-ratio-combining algorithm will be described in conjunction with FIG. 5.

Figure 5:
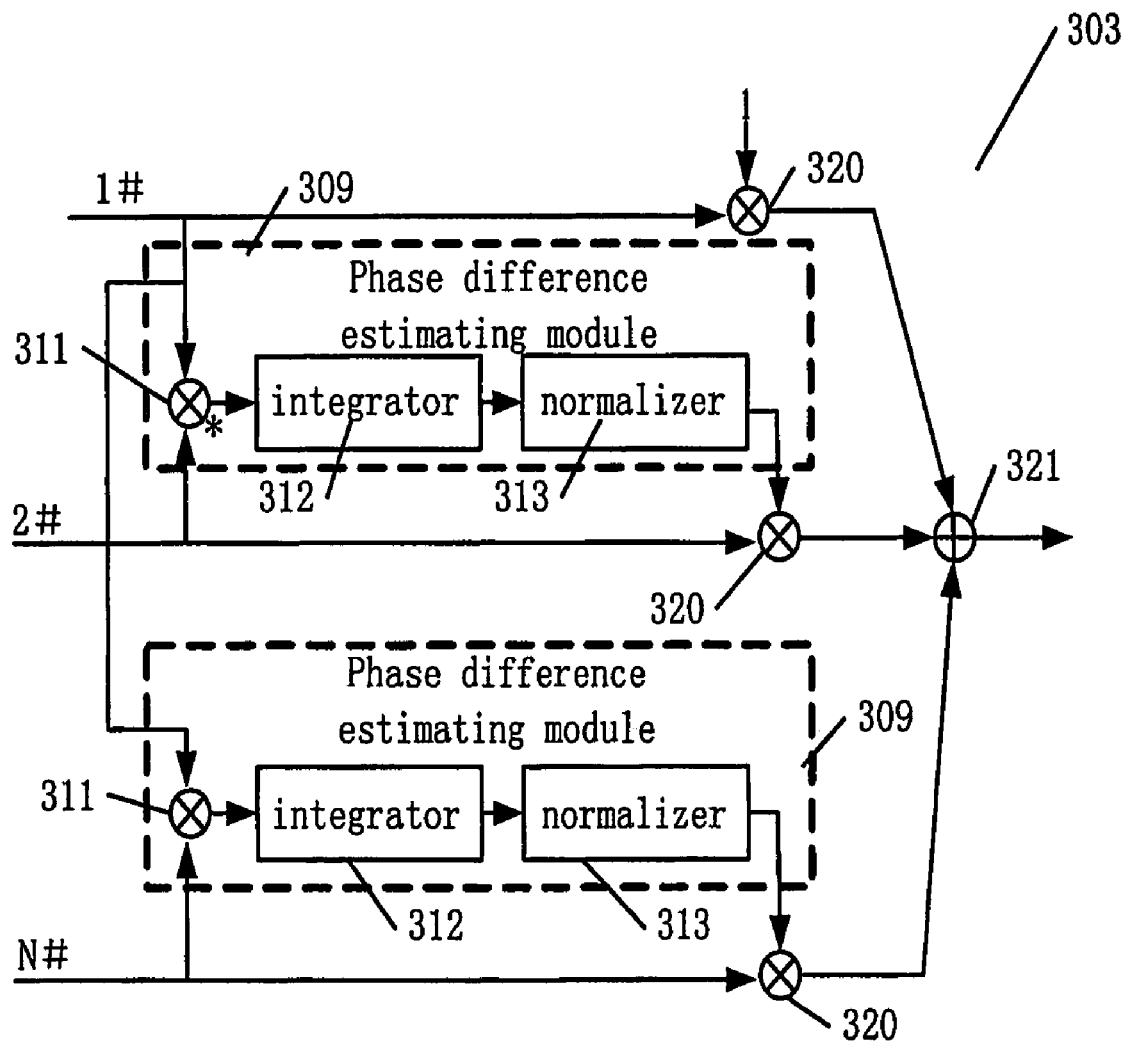
FIG. 5 is a schematic diagram of blind equal-gain-combining method in the receiving device of the multi-antenna mobile terminal.

FIG. 5 is a schematic diagram for the structure of spatial filter 303 in FIG. 4 when the blind equal-ratio-combining algorithm is adopted. As indicated in FIG. 5, the blind equal-ratio-combining algorithm comprises steps:

Firstly, selecting one signal out of signals from the plurality of match filters 300 as reference signal #1, others as other signals #2 to #N;

Secondly, multiplying the reference signal #1 by a constant (1 is assumed here) in a multiplier 320 of spatial filter 303;

Thirdly, in other multipliers 320 of spatial filter 303, multiplying the above other signals #2 to #N by the phase difference signals outputted from the N−1 phase difference estimating modules 309 of weight generating module 308 respectively. The role of phase difference estimating module 309 is to estimate the phase differences between reference signal #1 and other signals #2 to #N, and multiply other signals #2 to #N by the corresponding phase differences, thus compensating the phase difference of other signals #2 to #N relative to reference signal #1.

Therein, each of the N−1 phase difference estimating modules 309 comprises a multiplier 311, for multiplying the inputted reference signal #1 by corresponding conjugated signals of other signals #2 to #N; an integrator 312, for integrating the outputted signals from multiplier 311 respectively; a normalizer 313, for normalizing the outputted signals from integrator 312 and respectively outputting the normalized signals as the said phase difference signals to the corresponding N−1 multipliers 320 in spatial filter 303.

Fourthly, in adder 321 of spatial adder 303, adding the signals outputted from N multipliers 320 of spatial adder 303, and outputting the results to pulse shaper 305.

In the above blind equal-ratio-combining algorithm, when signals outputted from the N multipliers 320 are combined in step 4, the outputted signals from the N multipliers 320 can have the same phase even if without using the pilot signals. This conclusion can be deduced through the following mathematical model:

The received signal n# can be written as:

$$r_n(t)=h_n \times x(t)+z_n(t) \quad (1)$$

where $h_n$ is the complex parameter of wireless propagation channel for antenna n#, we assume it's constant in a certain period; x(t) is the source signal transmitted by base station and we assume it's normalized, namely $|x(t)|=1$; $z_n(t)$ is the noise and interference in channel n#, the variance is assumed to be $\sigma^2$. So the output of the integrator 312 will be:

$$a_n = \int_0^T r_1(t).r_n^*(t).dt = \quad (2)$$
$$T.h_1.h_n^* + \int_0^T h_1 x(t).z_n^*(t).dt + \int_0^T h_n^* x^*(t) z_1(t) dt + \int_0^T z_1(t).z_n^*(t) dt$$

Wherein, the later three terms are all noises.

From equation (2) we can also get the SNR (Signal-to-Noise) of $\alpha_n$ as:

$$SNR = \frac{|h_1|^2 \cdot |h_n|^2 T}{|h_1|^2 \sigma^2 + |h_n|^2 \sigma^2 + \sigma^4} \quad (3)$$

From equation (3), we can see that the SNR can be improved through increasing the integrating period. At a high SNR scenario, noises can be ignored, so equation (2) can be represented as $a_n=T \cdot h_1 \cdot h_n^*$.

And the output of normalization module 313 could be written as:

$$\frac{a_n}{|a_n|} = \frac{T \cdot h_1 \cdot h_n^*}{|T \cdot h_1 \cdot h_n^*|} = \frac{h_1}{|h_1|} \cdot \frac{h_n^*}{|h_n^*|} = \exp\{j \cdot \arg(h_1) - j \cdot \arg(h_n)\} \quad (4)$$

Wherein, arg(.) is used to acquire the complex phase.

The result of equation (4) is just the phase difference outputted from phase difference estimating module 309. Using the phase difference to multiply the original signal i#, we will get:

$$r_n(t)\exp\{j \cdot \arg(h_1)-j \cdot \arg(h_n)\}=|h_n|\exp\{j \cdot \arg(h_1)\} \cdot x(t)+z_n'(t) \quad (5)$$

It can be seen from equation (5) that the compensated signal has the same phase with signal #1, therefore, according to this mathematical model, compensated signals #2 to #N outputted from the N−1 multipliers 320 have the same phase with signal #1 in FIG. 5, so as to meet the requirement for equal-ratio-combining processing in adder 321.

The above blind equal-ratio-combining algorithm can be implemented in computer software, as well as hardware.

2. Normal Connection Stage

(1) Configuration of MA Module 206

After successful cell searching, the mobile terminal will enter normal connection stage, during which the mobile terminal keeps receiving signals from the base station, for example broadcast channel signals.

In this section, the normal connection scenario is discussed, wherein the mobile terminal only receives signals from one base station (compared to macro diversity), and the base station adopts conventional transmit antenna (compared to transmitting diversity or smart antenna).

Figure 6:
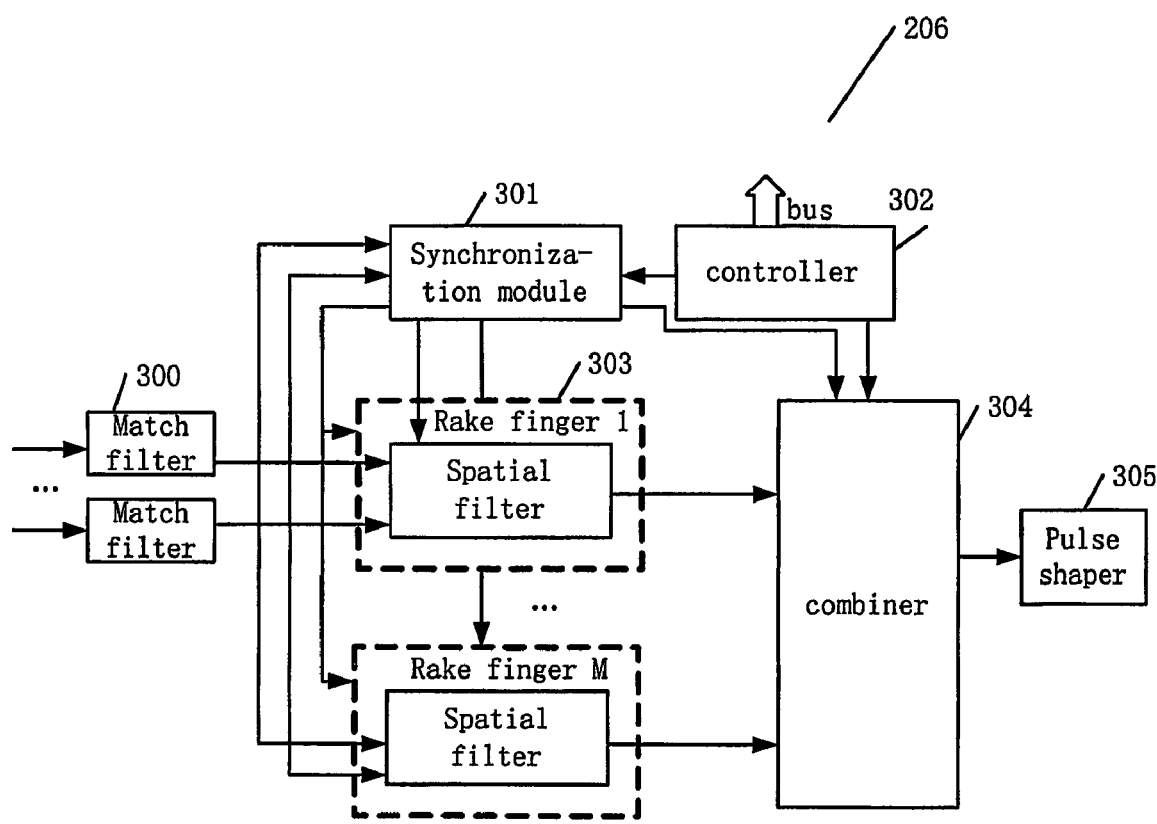
FIG. 6 illustrates the configuration of MA module in FIG. 3 at normal connected stage.

In this scenario, the MA module in FIG. 3 is configured as spatial Rake structure, and each spatial filter 303 forms each finger of the Rake receiver as shown in FIG. 6. In FIG. 6, as indicated above, synchronization module 301 searches multi-path ingredients and sends their delay parameters to the plurality of spatial filters 303; the plurality of spatial filters 303 receive delay parameter 5 from synchronization module 301, filter the signals outputted from MF 300 by using certain spatial processing algorithms, to filter out the corresponding signal ingredients with certain delays while suppressing others, according to the spatial features of the signals; combiner 304 combines the signals outputted from each spatial filter 303 after time aligning, according to synchronization information from synchronization module 301 and instructions from controller 302.

The spatial processing algorithms performed by the spatial filter 303 will be elaborated in the following section, in conjunction with FIG. 7, FIG. 8 and FIG. 9.

(2) Algorithms Performed by Module 206 (Improved LMS Algorithms)

Brief introduction will be given to present LMS (Least Mean Square error) algorithm before several improved LMS algorithms proposed by this invention are described.

LMS (or N-LMS: Normalized Least Mean Square error) algorithm is a kind of spatial processing algorithm based on MMSE (Minimum Mean Square Error) rule. After processed by this algorithm, the received signal will converge to a certain reference signal. In practical applications, pilot signal or data signal from decision feedback are usually adopted as the reference signal, but pilot signal and data signal from decision feedback have no amplitude information, therefore, the amplitude information of the received signal will be lost after conventional LMS processing.

If the said LMS (or N-LMS) algorithm is applied in MA module 206 proposed by this invention, multi-path signals outputted from each spatial filter 303 all converge to a uniform reference signal. This means the strong path signal will be suppressed while the weak one will be amplified in order to converge to the same reference signal. Therefore, in this case, the diversity combining of multi-path signals is Inverse-Ratio-Combining, whose gain is far lower than Equal-Ratio-Combining and Maximum-Ratio-Combining (MRC).

To implement MRC processing of multi-path signals outputted from each spatial filter 303, three improved LMS algorithms are provided in this invention. Of course, these algorithms can also be extended to NLMS and other LMS algorithms.

Improved LMS Algorithm 1

Figure 7:
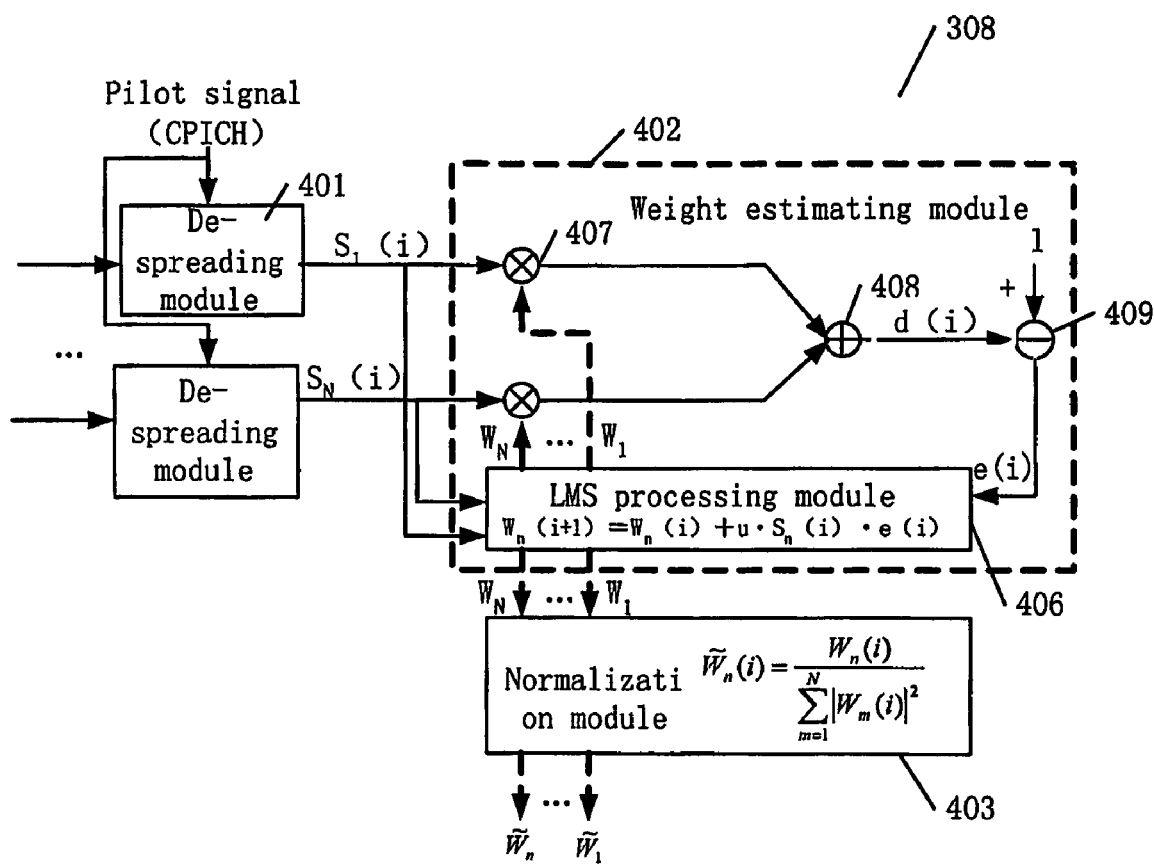
FIG. 7 is a schematic diagram for realizing spatial filter algorithm 1 in the receiving device of multi-antenna mobile terminals.

As illustrated in FIG. 7, de-spreading module 401 de-spreads vector signals with one chip rate from MF 300, according to pilot signals from MF 300.

In WCDMA systems, the pilot signals are CPICH (Common Pilot Channel) signals, containing spreading code and symbol information, so they are required to be de-spread to obtain de-spread signals without spreading code and symbol information. As shown in FIG. 8, the de-spread signals, namely $[S_1(i)\ldots S_N(i)]^T$ in FIG. 7, no longer contain spreading code and symbol information.

In LMS algorithm 1 shown in FIG. 7, a constant 1 is provided as the above reference signal to weight estimating module 402. The weight estimating module 402 performs conventional LMS processing.

The conventional LMS algorithm includes:
Initialization $i = 0,$ Step 1

$W_n(i) = \dfrac{1}{\sqrt{N}}, n = 0, 1, \ldots N$ Step 2

Iteration $i = i + 1;$ Step 3

$e(i) = 1 - \sum_{n=1}^{N} W_n(i) * S_n(i)$ Step 4

$W_n(i+1) = W_n(i) + u.S_n(i).e^*(i)$ Step 5 return to step 3 Step 6

In the above algorithm, u is a parameter used to adjust step length.

The above step 4 is completed by two or more than two multipliers 407, an adder 408, and a subtracter 409 together, and step 5 is realized by LMS processing module 406.

As said above, the conventional LMS is based on MMSE rule. After combined with the LMS weights, the received signal will approach to a uniform reference signal, namely 1 in FIG. 7, which means the amplitudes of weights $[W_1, W_2, \ldots W_N]$ are nearly inverse with signal strength, i.e. the stronger the signal, the less the weight. In order to implement MRC combining of multi-path, we normalize the weights of $W_1, W_2, \ldots W_N$ in normalization module 403 as follows:

$$\tilde{W}_n(i) = \dfrac{W_n(i)}{\sum_{m=1}^{N} |W_m(i)|^2}$$

It can be seen from the above equation that weights $[\tilde{W}_1, \tilde{W}_2, \ldots \tilde{W}_N]$ are nearly direct ratio with signal strength, i.e. the stronger the signal, the bigger the weights. In this way, Maximum-Ratio combining of multi-path signals can be implemented. The weights $[\tilde{W}_1, \tilde{W}_2, \ldots \tilde{W}_N]$ will be sent to each multiplier 320 in FIG. 3.

Improved LMS Algorithm 2

Figure 8:
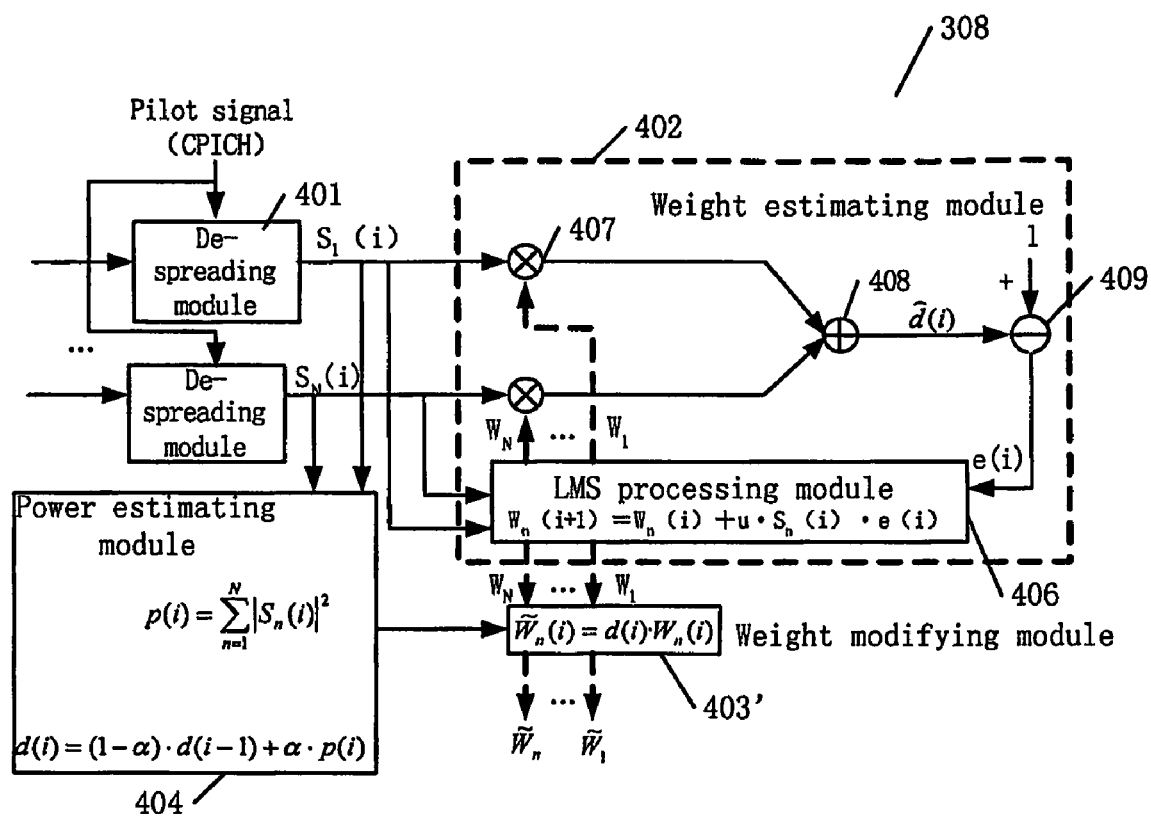
FIG. 8 is a schematic diagram for realizing spatial filter algorithm 2 in the receiving device of multi-antenna mobile terminals.

As shown in FIG. 8, algorithm 2 estimates the signal's power before conventional LMS combining, and then modifies the LMS weight outputs using the estimated power in weight modifying module 403'. The formula is modified as follows:

$\tilde{W}_n(i)=d(i).W_n(i), n=1, 2 \ldots N$ where $\tilde{W}_n$ (n=1,2 . . . N) are modified weights, which are direct ratio to the signal strength and will be sent to each multiplier 320 in FIG. 3; $W_n$ (n=1,2, ... N) are the weights got by conventional LMS algorithm and implemented by weight estimating module 402 (the same with FIG. 7); d(i) is the signal power estimated by power estimating module 404. Power estimation is implemented in the following equation:

$$p(i) = \sum_{n=1}^{N} |S_n(i)|^2, \quad d(i) = (1-\alpha) \cdot d(i-1) + \alpha \cdot p(i)$$

Wherein α is forgotten factor from 0 to 1.

Improved LMS Algorithm 3

Different from the above algorithms, this algorithm will estimate signal's power first, and provide the estimated power as reference signal instead of constant 1, to weight estimating module 402. In this way, the LMS algorithm will converge to signal's power, and that's just MRC wants. The detailed algorithm is described as follows.

Modified LMS algorithm 3 implemented in weight estimating module 402:

Initiation $i = 0,$     Step 1

$W_n(i) = \dfrac{1}{\sqrt{N}}, n = 0, 1, \ldots N$     Step 2

Iteration $i = i + 1;$     Step 3

$d(i) = (1-\alpha).d(i-1) = \alpha \cdot \sum_{n=1}^{N} |S_n(i)|^2$     Step 4

$e(i) = d(i) - \sum_{n=1}^{N} W_n(i) * S_n(i)^\ast$     Step 5

$W_n(i+1) = W_n(i) + u.S_n(i).e^*(i)$     Step 6 return to step 3     Step 7

Here weights [$W_1, W_2, \ldots W_N$] are directly sent to each multiplier in FIG. 3. The step 4 is used to estimate signal power by using power estimating module 404, wherein α is forgotten factor from 0 to 1.

As said above, the three methods can also be extended to other LMS algorithms, for example N-LMS.

The improved LMS algorithms described above in conjunction with FIG. 7, FIG. 8 and FIG. 9, can be realized in computer software, as well as in hardware.

3. Complicated Scenario

In the above description of the receiving device of a multi-antenna mobile terminal at normal connection stage, it's assumed that the mobile terminal only receives signals from one base station (instead of macro diversity), and the base station uses conventional transmit antenna (instead of transmit diversity or smart antenna).

The following section will describe the receiving device and receiving method for multi-antenna mobile terminals when the base station transmits signals using macro diversity, transmit diversity or smart antenna.

A brief introduction of macro diversity, transmit diversity and smart antenna technology will be offered firstly.

(1) Macro Diversity

WCDMA systems support macro diversity, namely soft handover. As FIG. 10 indicated, when the mobile terminal is at the border of cells, it will keep radio links with two or more base stations simultaneously in order to improve quality of radio connection and provide seamless handover. Therefore, in this case the mobile device will receive signals from several base stations at the same time.

(2) Transmit Diversity

Transmit diversity technology is supported in WCDMA systems, to improve the performance in downlink. In WCDMA standard, several transmit diversity algorithms are defined, including closed-loop transmit diversity and open-loop transmit diversity. In transmit diversity, the same signal in a base station is made into two copies after relevant processing, and then sent out from two antennas respectively.

(3) Smart Antenna

Smart antenna is another key technology adopted for base stations in WCDMA systems. In the case of adopting smart antenna in the base station, common signals, for example CCPCH (Common Control Physical Channel), are transmitted to the whole cell using omni-antenna or sector antenna, while dedicated signals, for example DPCH (Dedicated Physical Channel), are transmitted to the corresponding user equipment directionally using adaptive antenna. The two types of signals pass through different wireless channels and have different channel parameters (including fading and direction of arrival).

Figure 11:
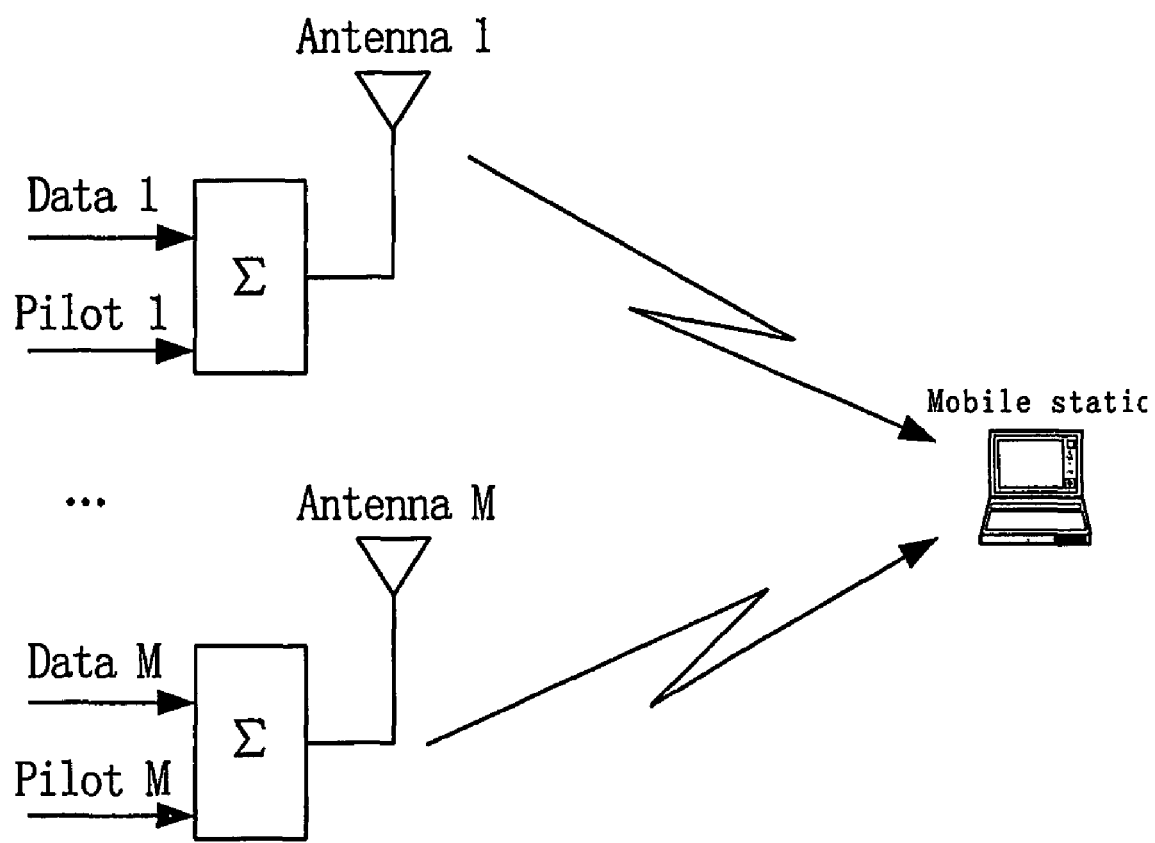
FIG. 11 is a schematic diagram for multi-antenna transmission at base station side.

From the perspective of the mobile terminal, the above three scenarios can all be illustrated by FIG. 11, namely multi-antenna transmit at network side. The different antennas in FIG. 11 could represent different base stations (for macro diversity), or different diversity transmit antenna (for transmit diversity), or omni-antenna (for sector antenna) and smart antenna (for smart antenna) respectively.

As the figure shown, signals of each antenna include data signals and dedicated pilot signals. These pilot signals are orthogonal or almost orthogonal depending on the detailed scenarios as follows.

(1) Micro diversity scenario: Different cells adopt different scramble codes, so pilot signals, e.g. CPICHs, are almost orthogonal. For further information, please see 3G TS 25.213, de-spreading and modulation (FDD).

(2) Transmit Diversity: The CPICH signals are transmitted from two antennas using the same spreading code (including channel code and scramble code). However, the predefined symbol sequence of the CPICH is different. So in a period of time slot or several symbols, the CPICH signals transmitted from two antennas are orthogonal. In this scenario, the integration interval of de-spreading in FIG. 7, FIG. 8 and FIG. 9 will be expanded to one time slot or several symbols from one symbol.

(3) Smart antenna scenario: In this case, network employs the Primary CPICH for omni-antenna (or sector antenna), and employs the secondary CPICH for directional antenna (or adaptive antenna). They are orthogonal.

In this invention, MA module 206 of the mobile terminal in FIG. 3 will distinguish and separate these signals from different transmit antennas based on the orthogonal feature of pilot signals.

Figure 12:
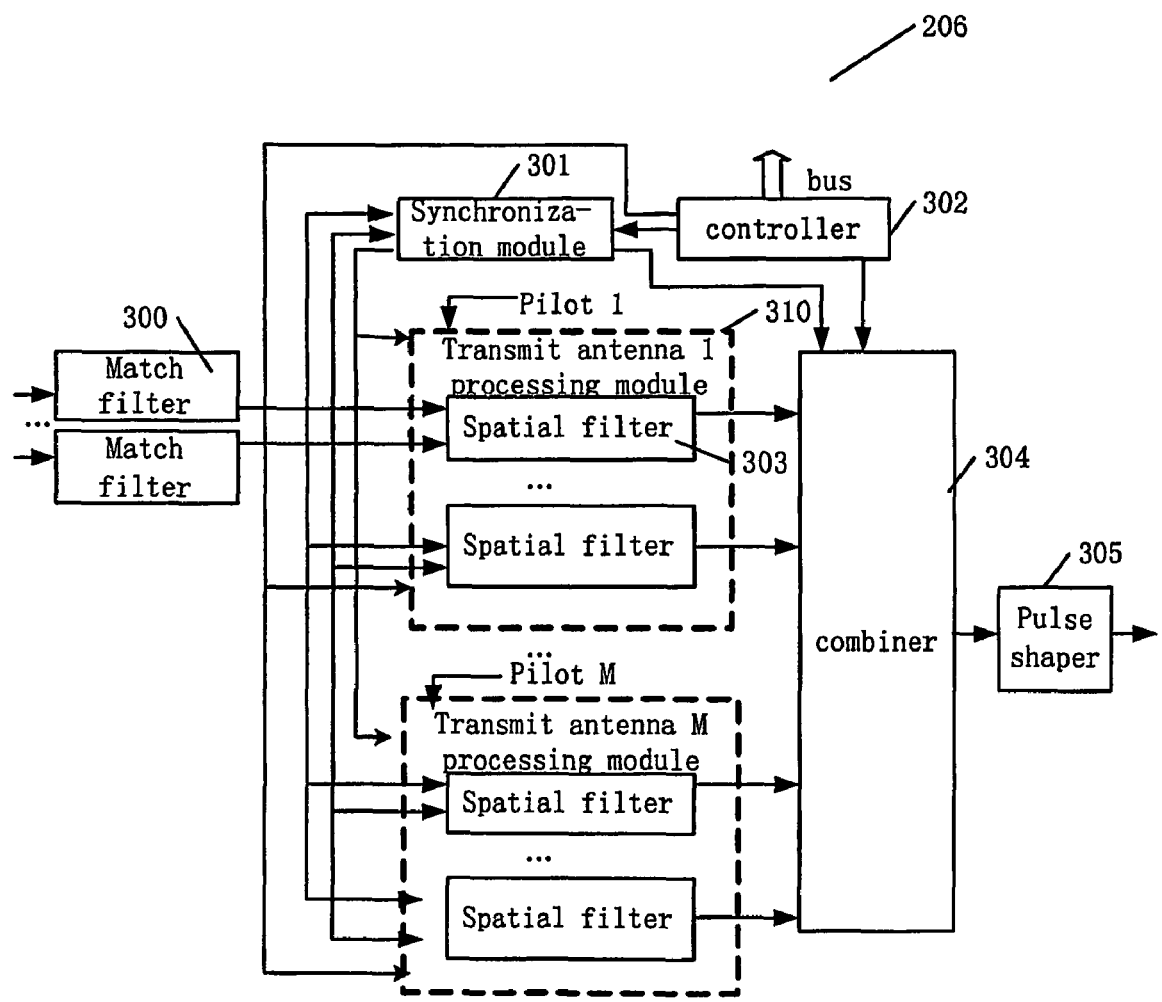
FIG. 12 demonstrates the corresponding configuration of MA module in FIG. 3 when the base station performs multi-antenna transmission.

FIG. 12 shows the configuration of MA module 206. In the case of multi-antenna transmitting at network side, the MA module 206 includes a plurality of processing modules 310 for different transmit antennas to respectively receive and process signals from different transmit antennas. Every processing module 310 for different transmit antennas is responsible to receive and process signals from a specific transmit antenna, composed of a group of spatial filters 303 and configured with the corresponding pilot code. Each group of spatial filters 303 contain a plurality of spatial filters 303, where each spatial filter 303 focus on processing signals of one specific path of multi-path signals from the same transmit antenna, including: receive signals from each MF 300, set its working mode and parameters according to instructions from controller 302 and synchronization information from synchronization module 301, and separate each specific signals from mixed signals according to the spatial features of signals of each channel (or base station).

Here, the above blind equal-ratio-combining algorithm for mobile terminals described in FIG. 5 can still be employed to equal-ratio combine signals that are to be inputted to different group of spatial filters 303.

Figure 9:
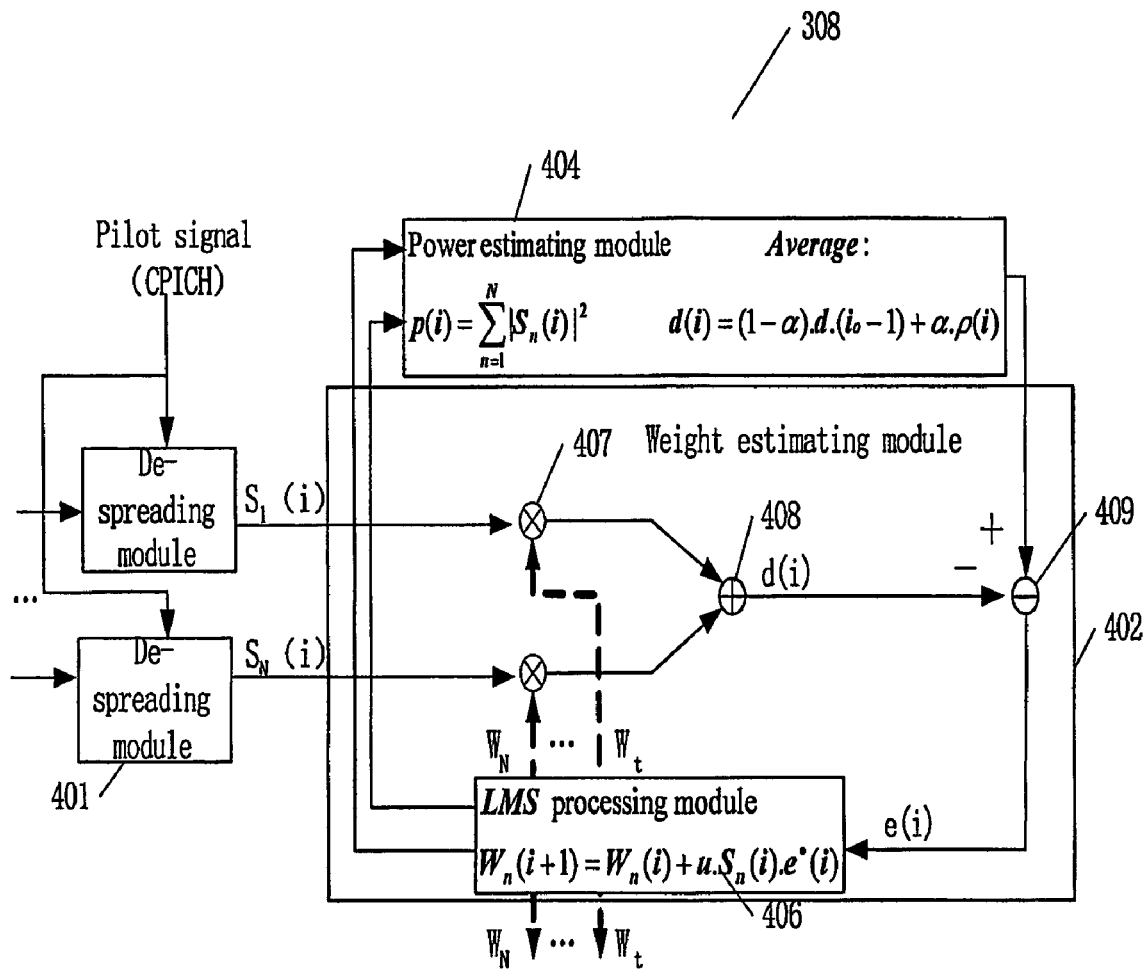
FIG. 9 is a schematic diagram for realizing spatial filter algorithm 3 in the receiving device of multi-antenna mobile terminals.
Figure 10:
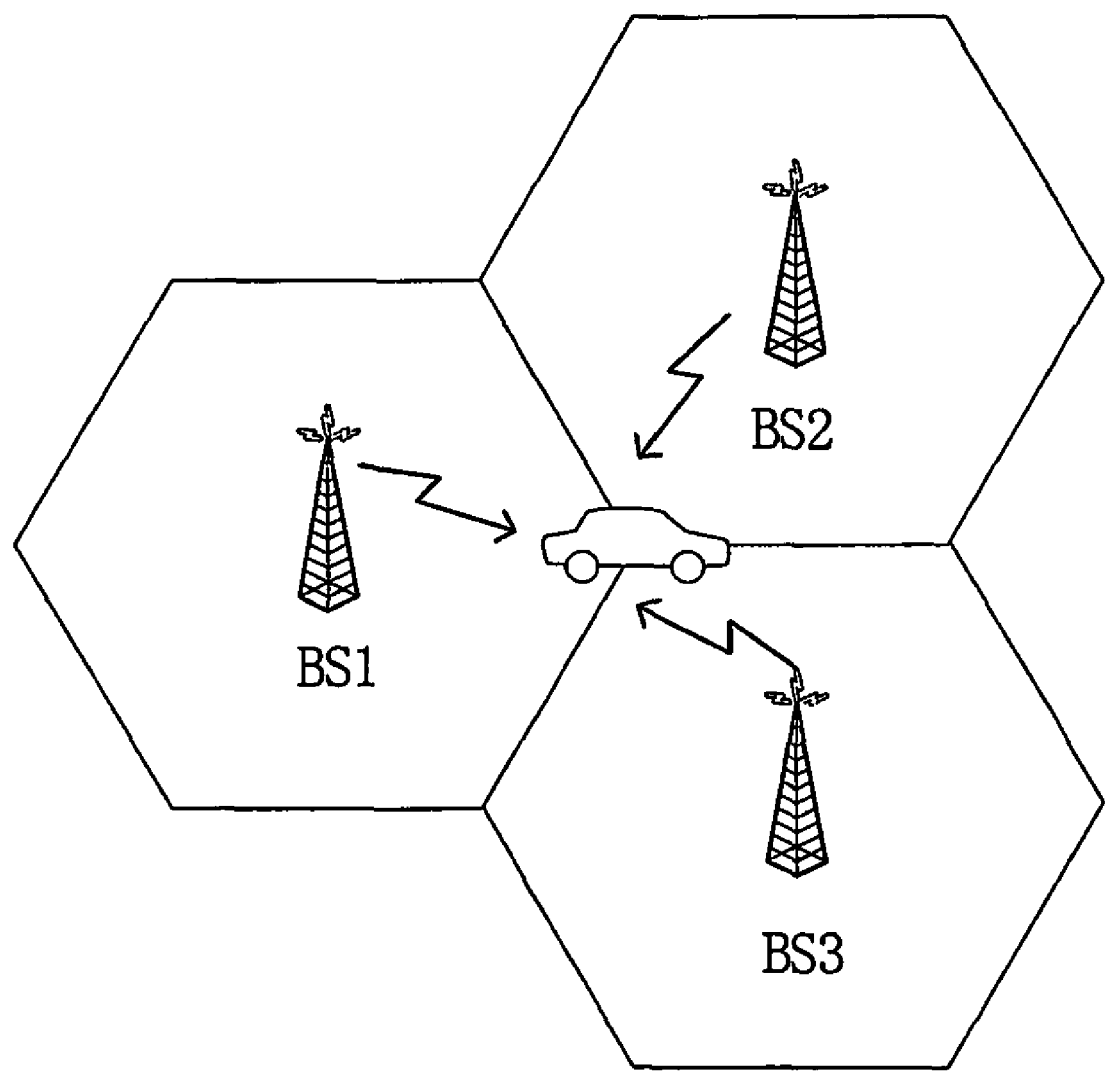
FIG. 10 is a schematic diagram of a mobile terminal in macro diversity scenario.

Similarly, the three algorithms in FIG. 8, FIG. 9 and FIG. 10 can be also reused here. The outputs of different group of spatial filters 303 are combined after being time aligned, and then supplied to the baseband MODEM module 203 in FIG. 2 through pulse shaper 305.

Different from uni-antenna transmit scenario, the synchronization module 301 in FIG. 12 will establish and keep synchronization with multiple transmit antennas of base stations, and supply the multi-path information (including delays) to corresponding group of spatial filters 303 and combiner 304.

Beneficial use of the Invention

From the above description of the invention in conjunction with accompanying figures, it can be clearly seen that a stand-alone MA module is inserted into present mobile terminals, information about working status of the mobile terminal and configuration of the base station's antenna can be sent to the MA module, and signals processed by the MA module have been combined to single-channel signals before being sent to baseband MODEM via the bus, therefore, the stand-alone MA module can reuse the software and hardware design of standard baseband MEDEM.

Meanwhile, the MA module can receive working status of the mobile terminal and configuration of the base station's antenna via the bus, therefore the controller in the MA module can facilitate the receiving device of the mobile terminal to make different configurations, and select different multi-antenna processing algorithms, according to the working status of the mobile terminal and the configuration of the base station's antenna.

Furthermore, blind equal-ratio-combining algorithm is employed to improve the probability of successful accessing performed by mobile terminals cell search stage in the invention; improved LMS algorithm is adopted to implement MRC at normal connection stage, which effectively boosts the performance of communication systems.

Of course, it will be understood by those skilled in the art that the receiving device and method for multi-antenna mobile terminals as provided by this invention may not be only limited to mobile phone systems, but also applicable to other wireless mobile communication terminals, WLAN terminals and etc.

At the same time, it will be understood by those skilled in the art that the receiving device and method for multi-antenna mobile terminals as provided in this invention may not be only limited to WCDMA systems, but also applicable to communication systems with CDMA IS95, CDMA 2000 standards and etc.

It will also be understood by those skilled in the art that various modifications can be made to the smart antenna receiving device and method for mobile phones as proposed by this invention, without departing from the fundamentals of the contents of the invention. Therefore, the scope of the invention to be protected needs to be defined by what is claimed.

What is claimed is:

1. A mobile terminal with multi-antenna based on CDMA, comprising:
   a plurality of groups of radio frequency signal processing modules, for transforming received multi-channel radio frequency signals based on CDMA to multi-channel baseband signals;
   a multi-antenna module, for combining said multi-channel baseband signals outputted from said plurality of groups of radio frequency signal processing modules into single-channel baseband signals according to control information received one-off when said multi-antenna module enables a multi-antenna baseband processing; and
   a baseband processing module, for providing said control information to said multi-antenna module and baseband processing said single-channel baseband signals outputted from said multi-antenna module,
   wherein said control information at least includes: working status information of the mobile terminal and configuration information of a base-station's antennas.

2. The mobile terminal of claim 1, wherein said multi-antenna module includes
   a plurality of spatial filters, corresponding to the plurality of groups of radio frequency signals processing modules, each of the plurality of spatial filters setting its working mode according to received instruction, and processing said baseband signals according to received information related to spatial features of signals of each specific path to separate signals of said each specific path from mixed signals;
   a combiner, combining signals outputted from each of said spatial filters according to received synchronization information and said instruction;
   a synchronization module, providing said information related to spatial features of signals of each specific path to the plurality of spatial filters according to said instruction and said multi-channel baseband signals, and providing said synchronization information to said combiner; and
   a controller, receiving said control information from said baseband processing module, and providing said instruction to said synchronization module, the plurality of spatial filters and said combiner.

3. The mobile terminal of claim 2, wherein said controller includes a time alignment means, for time-aligning said signals outputted from each of the plurality of spatial filters.

4. The mobile terminal of claim 3, wherein said combiner includes:
   a plurality of delayers, for delaying each of the output signals from the plurality of spatial filters to obtain synchronized signals under the control of the synchronization module; and
   a combiner, for combining the synchronized signals delayed by said plurality of delayers.

5. The mobile terminal of claim 4, wherein the plurality of delayers can be implemented using FIFO (First In First Out) technology and the value of delayer can be adjusted by controlling the deepness of the FIFO.

6. The mobile terminal of any of claim 2, wherein each of the plurality of spatial filters includes:
- a plurality of multipliers, for multiplying said multi-channel baseband signals by provided corresponding parameters respectively;
- a signal combiner, for combining signals outputted from each of the plurality of multipliers and outputting combined results; and
- a weight generating module, for executing corresponding operations according to said multi-channel baseband signals and said instruction to provide said corresponding parameters to said plurality of multipliers respectively.

7. The mobile terminal of claim 6, wherein when said instruction indicates that the mobile terminal is at a cell search stage, only one of said spatial filters is active and a blind equal-ratio-combining algorithm is executed in said weight generating module.

8. The mobile terminal of claim 7, wherein said blind equal-ratio-combining algorithm includes:
- selecting one of said multi-channel baseband signals as reference signals;
- applying a multiplication, an integration and a normalization respectively to the reference signals and conjugated signals of the other signals of said multi-channel baseband signals to obtain relative phase differences of said other signals of said multi-channel baseband signals compared with said reference signals; and where in
- said corresponding parameters obtained by the plurality of multipliers of the spatial filter respectively are: said parameter obtained by a multiplier corresponding to said reference signals is a constant, said parameters obtained by multipliers corresponding to said other signals of said multi-channel baseband signals are said relative phase differences.

9. The mobile terminal of claim 6, wherein when said instruction indicates that the mobile terminal is at a normal connected stage, the plurality of spatial filters set the working mode thereof as Rake receiving mode and each of the plurality of spatial filters forms each finger of the Rake receiving, at this time said weight generating module executes a weight generation and said corresponding parameters provided to the plurality of multipliers are weights corresponding to the multi-channel baseband signals obtained by the weight generation.

10. The mobile terminal of claim 9, wherein the weight generation executed by the weight generating module includes:
- (a) de-spreading said multi-channel baseband signals;
- (b) selecting a constant parameter as the reference signal and applying a weight estimation to the de-spread signals; and
- (c) normalizing each of weights obtained in the weight estimation to obtain the weights respectively corresponding to said multi-channel baseband signals.

11. The mobile terminal of claim 10, wherein the weight estimation includes LMS (Least Mean Square error) algorithm or N-LMS (Normalized Least Mean Square error) algorithm.

12. The mobile terminal of claim 9, wherein the weight generation executed by the weight generating module includes:
- (a) de-spreading said multi-channel baseband signals;
- (b) selecting a constant parameter as the reference signal and applying an estimation of weights to the de-spread signals;
- (c) applying a power estimation to the de-spread signals; and
- (d) revising each of weights obtained in the weight estimation to obtain the weights respectively corresponding to the multi-channel baseband signals according to a power signal obtained in the power estimation.

13. The mobile terminal of claim 9, wherein the weight generation executed by the weight generating module includes:
- (a) de-spreading said multi-channel baseband signals;
- (b) applying a power estimation to the de-spread signals; and
- (c) making a power signal obtained in said power estimation as the reference signal and applying an estimation of weights to the de-spread signals to obtain the weights respectively corresponding to the multi-channel baseband signals.

14. The mobile terminal of claim 1, wherein said multi-antenna module includes:
- a plurality of processing modules corresponding to a plurality of transmit antennas in a wireless communication system, for receiving and processing signals from a plurality of transmit antennas, wherein
- each of said processing modules corresponding to transmit antenna is composed of a group of spatial filters, and receives and processes signals from a specific transmit antenna, wherein
- said group of spatial filters includes a plurality of spatial filters, each setting its working mode according to received instruction and processing said multi-channel baseband signals according to received information related to spatial features of signals of each specific path to separate signals of each specific path from mixed signals;
- a combiner, for combining signals outputted from said each group of spatial filters according to received synchronization information and said instruction;
- a synchronization module, for providing said information related to spatial features of signals of each specific path to said each group of spatial filters in said each processing module corresponding to transmit antenna according to said instruction and said multi-channel baseband signals, and providing said synchronization information related to signals transmitted by the plurality of transmit antennas to said combiner; and
- a controller, for receiving said control information from said baseband processing module and providing said instruction to said synchronization module, the plurality of spatial filters in said each processing module corresponding to transmit antenna and said combiner.

15. The mobile terminal of claim 14, wherein said combiner includes: a time alignment means, for time-aligning signals outputted from each of said spatial filters.

16. The mobile terminal of claim 1, wherein the terminal is applied to mobile terminals or other mobile wireless communication terminals, wireless LAN terminals employing one of following standards: WCDMA, IS95, CDMA2000.

17. A method for a mobile terminal with multi-antenna based on CDMA, comprising:
- (a) transforming received multi-channel radio frequency signals based on CDMA to multi-channel baseband signals;
- (b) combining said multi-channel baseband signals into single-channel baseband signals according to control information received one-off when a multi-antenna baseband processing is enabled; and (c) baseband processing said single-channel baseband signals,
wherein said control information at least includes: working status information of the mobile terminal and configuration information of a base-station's antennas.

18. The method of claim 17, wherein step (b) includes:
generating a instruction for controlling said combining according to said control information; and
setting a working mode according to said instruction.

19. The method of claim 18, wherein when the instruction indicates that the mobile terminal is at a cell search stage, step (b) further includes:
(1) selecting one of said multi-channel baseband signals as reference signals;
(2) applying a multiplication, an integration and a normalization respectively to said reference signals and conjugated signals of the other signals of said multi-channel baseband signals to obtain relative phase differences of said other signals of said multi-channel baseband signals compared with said reference signals;
(3) multiplying said reference signals by a constant and multiplying the other signals of the multi-channel baseband signals with said relative phase differences; and
(4) combining results obtained by said multiplications and outputting combined results.

20. The method of claim 18, wherein when said instruction indicates that the mobile terminal is at a normal connected stage, step (b) further includes:
(b1) obtaining information related to spatial features of signals of each specific path and synchronization information related to the multi-channel baseband signals according to the input multi-channel baseband signals;
(b2) processing the multi-channel baseband signals to separate signals of each specific path from mixed signals according to said information related to spatial features of signals of each specific path; and
(b3) combining separated signals from said mixed signals with different delay ingredients and outputting combined results according to said synchronization information.

21. The method of claim 20, wherein step (b3) further includes: said signals with different delay ingredients are time-aligned, then combined, and the combined results are outputted.

22. The method of claim 21, wherein the time-aligning said separated signals from said mixed signals with different delay ingredients includes:
delaying each signals of said specific path with different delay ingredients according to said synchronization information; and
combining delayed synchronization signals.

23. The method of claim 22, wherein the delay can be implemented using FIFO (First In First Out) technology and the value of said delayer can be adjusted by controlling the deepness of the FIFO.

24. The method of claim 18, wherein when said instruction indicates that the mobile terminal is at a soft handover stage or the base-station transmits signals by transmit diversity or smart antenna, step (b) includes:
(b1) obtaining information related to spatial features of signals of specific path in each group of multi-channel baseband signals, and synchronization information related to signals transmitted by a plurality of transmit antennas according to a plurality of groups of multi-channel baseband signals;
(b2) processing the multi-channel baseband signals to separate signals of each specific path in each group from mixed signals according to said information related to spatial features of signals of each specific path in each group; and
(b3) combining the separated signals from said mixed signals with different delay ingredients and outputting the combined results according to said synchronization information.

25. The method of claim 24, wherein step (b3) further includes: said signals with different delay ingredients are time-aligned, then combined, and the combined results are outputted.

26. The method of claim 20, wherein processing the multi-channel baseband signals to separate signals of each specific path from mixed signals includes:
(1) multiplying each of the multi-channel baseband signals by a weight corresponding to each of the multi-channel baseband signals obtained by a weight calculation; and
(2) combining weighted signals and outputting combined results.

27. The method of claim 26, wherein the weight calculation includes:
(a) de-spreading said multi-channel baseband signals;
(b) selecting a constant parameter as the reference signal and applying a weight estimation to the de-spread signals; and
(c) normalizing each of weights obtained in the weight estimation to obtain the weights respectively corresponding to said multi-channel baseband signals.

28. The method of claim 27, wherein the weight estimation includes LMS or N-LMS.

29. The method of claim 26, wherein the weight calculation includes:
(a) de-spreading said multi-channel baseband signals;
(b) selecting a constant parameter as the reference signal and applying an estimation of weights to the de-spread signals;
(c) applying a power estimation to the de-spread signals; and
(d) revising each of weights obtained in the weight estimation to obtain the weights respectively corresponding to the multi-channel baseband signals according to a power signal obtained in the power estimation.

30. The method of claim 26, wherein the weight calculation includes:
(a) de-spreading said multi-channel baseband signals;
(b) applying a power estimation to the de-spread signals; and
(c) making a power signal obtained in said power estimation as the reference signal and applying an estimation of weights to the de-spread signals to obtain the weights respectively corresponding to the multi-channel baseband signals.

31. The method of claim 17, wherein the method is applied to mobile terminals or other mobile wireless communication terminals, wireless LAN terminals employing one of following standards: WCDMA, IS95, CDMA2000.

32. A multi-antenna processing device, comprising:
a plurality of spatial filters, each of the plurality of spatial filters setting its working modes according to received instruction, and processing multi-channel baseband signals according to received information related to spatial features of signals of each specific path to separate signals of said each specific path from mixed signals;
a combiner, for combining signals outputted from each of said spatial filters according to received synchronization information and said instruction;

a synchronization module, for providing said information related to spatial features of signals of each specific path to the plurality of spatial filters according to said instruction and said input multi- channel baseband signals, and providing said synchronization information to said combiner; and a controller, for providing said instruction to said synchronization module, the plurality of spatial filters and said combiner according to received control information, wherein said control information at least includes: working status information of the mobile terminal and configuration information of a base-station's antennas.

33. The device of claim 32, wherein said controller includes a time alignment means, for time-aligning said signals outputted from each of the plurality of spatial filters.

34. The device of claim 33, wherein said combiner includes:
a plurality of delayers, delaying each of the output signals from the plurality of spatial filters to obtain synchronized signals under the control of the synchronization module; and
a combiner, for combining the synchronized signals delayed by said a plurality of delayers.

35. The device of claim 34, wherein the plurality of delayers can be implemented using FIFO (First In First Out) technology and the value of delayer can be adjusted by controlling the deepness of the FIFO.

36. The device of claim 32, wherein the spatial filter includes:
a plurality of multipliers, for respectively multiplying said input multi-channel baseband signals by provided corresponding parameters;
a signal combiner, for combining signals outputted from each of the plurality of multipliers and outputting combined results; and
a weight generating module, for executing corresponding operations, according to said multi-channel baseband signals and said instruction to respectively provide said corresponding parameters to the plurality of multipliers.

37. The device of claim 36, wherein when said instruction indicates that the mobile terminal is at a cell search stage, only one of the spatial filters is active, wherein said weight generating module executes a blind equal-ratio-combining algorithm.

38. The device of claim 37, wherein said blind equal-ratio-combining algorithm includes:
selecting one of said multi-channel baseband signals as reference signals;
applying a multiplication, an integration and a normalization respectively to the reference signals and conjugated signals of the other signals of said multi-channel baseband signals to obtain relative phase differences of said other signals of said multi-channel baseband signals compared with said reference signals; and
said corresponding parameters obtained by the plurality of multipliers of the spatial filter respectively are: said parameter obtained by a multiplier corresponding to the reference signal is a constant, said parameters obtained by multipliers corresponding to the other signals of said multi-channel baseband signals are said relative phase differences.

39. The device of claim 36, wherein when said instruction indicates that the mobile terminal is at a normal connected stage, the plurality of spatial filters set the working modes thereof as Rake receiving mode and each of the plurality of spatial filters forms each finger of the Rake receiving, at this time said weight generating module executes a weight generation and said corresponding parameters provided to the plurality of multipliers are weights corresponding to the multi-channel baseband signals obtained by the weight generation.

40. The device of claim 39, wherein the weight generation executed by the weight generating module includes:
(a) de-spreading said input multi-channel baseband signals;
(b) selecting a constant parameter as the reference signal and applying a weight estimation for the de-spread signals; and
(c) applying normalization to each of weights obtained in the weight estimation to obtain the weights respectively corresponding to said multi-channel baseband signals.

41. The device of claim 39, wherein the weight generation executed by the weight generating module includes:
(a) de-spreading said input multi-channel baseband signals;
(b) selecting a constant parameter as the reference signal and applying an estimation of weights to the de-spread signals;
(c) applying a power estimation to the de-spread signals; and
(d) revising each of weights obtained in the weight estimation to obtain the weights respectively corresponding to the multi-channel baseband signals according to a power signal obtained in the power estimation.

42. The device of claim 39, wherein the weight generation executed by the weight generating module includes:
(a) de-spreading said input multi-channel baseband signals;
(b) applying a power estimation to the de-spread signals; and
(c) making a power signal obtained in said power estimation as the reference signal and applying weight estimation to the de-spread signals to obtain the weights respectively corresponding to the multi-channel baseband signals.

43. The device of claim 40, wherein the weight estimation includes LMS operation or N-LMS operation.

44. A multi-antenna processing device, comprising:
a plurality of processing modules corresponding to a plurality of transmit antennas in a wireless communication system, receiving and processing signals from the plurality of transmit antennas, wherein
each of said processing modules corresponding to transmit antennas is composed of a group of spatial filters, and receives and processes signals from a specific transmit antenna, wherein
said group of spatial filters includes a plurality of spatial filters, each setting its working mode according to received instruction and processing multi-channel baseband signals according to received information related to spatial features of signals of each specific path to separate signals of each specific path mixed signals;
a combiner, for combining signals outputted from said each group of spatial filters according to received synchronization information and said instruction;
a synchronization module, for providing said information related to spatial features of signals of each specific path to said each group of spatial filters in said each processing module corresponding to transmit antenna according to said instruction and said input multi-channel baseband signals, and providing said synchronization information related to signals transmitted by the plurality of transmit antennas to said combiner; and a controller, for providing said instruction to said synchronization module, the plurality of spatial filters in said each processing module corresponding to transmit antennas and said combiner according to received control information, wherein said control information at least includes: working status information of the mobile terminal and configuration information of a base-station's antennas.

45. The device of claim 44, wherein said combiner includes: a time alignment means, for time-aligning signals outputted from each of said spatial filters.

46. A mobile terminal, comprising:

a transmitting means, for transmitting signals via an uplink;

a receiving means, wherein the receiving means includes:

a plurality of groups of radio frequency signal processing modules, for transforming received multi-channel radio frequency signals to multi-channel baseband signals;

a multi-antenna module, combining said multi-channel baseband signals outputted from the plurality of groups of radio frequency signal processing modules into single-channel baseband signals according to control information received one-off when said multi-antenna module enables a multi-antenna baseband processing; and a baseband processing module, providing said control information to said multi-antenna module and baseband processing said single-channel baseband signals outputted from said multi-antenna module, wherein said control information at least includes: working status information of the mobile terminal and configuration information of a base-station's antennas.

* * * * *